United States Patent
Jung et al.

(10) Patent No.: US 7,639,949 B2
(45) Date of Patent: Dec. 29, 2009

(54) TDM PON AND DYNAMIC BANDWIDTH ALLOCATION METHOD THEREOF

(75) Inventors: Dae-Kwang Jung, Suwon-si (KR); Seong-Taek Hwang, Pyeongtaek-si (KR); Jin-Woo Park, Seoul (KR); Sang-Rok Lee, Seoul (KR); Seong-Geun Lee, Seoul (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 533 days.

(21) Appl. No.: 11/644,570

(22) Filed: Dec. 22, 2006

(65) Prior Publication Data
US 2007/0189773 A1 Aug. 16, 2007

(30) Foreign Application Priority Data
Feb. 14, 2006 (KR) .................. 10-2006-0014181

(51) Int. Cl.
 *H04B 10/20* (2006.01)
 *H04B 10/12* (2006.01)
(52) U.S. Cl. .................. 398/98; 398/43; 398/67; 398/71; 398/72; 370/401; 370/420; 370/466

(58) Field of Classification Search ............ 398/98, 398/43, 67, 71, 72; 370/401, 420, 466
See application file for complete search history.

(56) References Cited

U.S. PATENT DOCUMENTS 5,896,213 A  4/1999  Nagahori et al. .......... 359/137

FOREIGN PATENT DOCUMENTS

| JP | 11-298430 | 10/1999 |
| KR | 2001-73397 | 8/2001 |
| KR | 2004-001028 | 1/2004 |
| KR | 2004-077250 | 9/2004 |

*Primary Examiner*—Hai Tran
*Assistant Examiner*—Amine Benlagsir
(74) *Attorney, Agent, or Firm*—Cha & Reiter, LLC

(57) ABSTRACT

A TDM PON including: an optical line terminal; a remote node including multiple secondary optical distributors connected to multiple optical network units; and the multiple optical network units generating and outputting a corresponding upstream optical signal. Each of the secondary optical distributors splits an upstream optical signal input from one of the optical network units connected thereto so as to generate split upstream optical signals and transmits one of the upstream optical signals to the optical line terminal, and transmits another upstream optical signal to a different optical network unit.

12 Claims, 3 Drawing Sheets

US 7,639,949 B2

TDM PON AND DYNAMIC BANDWIDTH ALLOCATION METHOD THEREOF

CLAIM OF PRIORITY

This application claims priority to an application entitled "TDM PON And Dynamic Bandwidth Allocation Method Thereof," filed in the Korean Intellectual Property Office on Feb. 14, 2006 and assigned Serial No. 2006-14181, the contents of which are hereby incorporated by reference.

BACKGROUND OF THE INVENTION

1. Field of the Invention

The present invention relates to a Passive Optical Network (PON), and more particularly to a Time-Division-Multiplexed (TDM) PON.

2. Description of the Related Art

In a TDM PON, multiple subscribers share a single wavelength. According to a static bandwidth allocation method, an Optical Line Terminal (OLT) statically allocates one time slot obtained by dividing one cycle to each subscriber. Each subscriber can transmit upstream optical signals to the OLT only during the allocated time slot. According to a dynamic bandwidth allocation method, the following steps are performed:

(1) an OLT transmits a message (information request message) requesting information about a required bandwidth to all Optical Network Units (ONUs);

(2) each of the ONUs having received the corresponding information request message transmits a message (bandwidth request message) including the information about the required bandwidth to the OLT;

(3) the OLT receives the bandwidth request messages from all of the ONUs, allocates a corresponding time slot within one cycle to each of the ONUs according to a preset bandwidth allocation algorithm, and transmits a message (bandwidth allocation information message) including information about the corresponding time slot to each of the ONUs;

(4) each of the ONUs having received the corresponding bandwidth allocation information message transmits upstream optical signals to the OLT during the allocated time slot; and (5) steps (1) to (4) are repeated in a cycle-by-cycle basis.

However, the TDM PON performing the dynamic bandwidth allocation method as described above has the following problems:

First, continuously performing steps (1) to (3) unnecessarily utilizes resources within the OLT resulting in a deterioration of service quality, for example, in services requiring realtime transmission; and Second, the OLT must have a complex processor for performing steps (1) to (3), which results in an increase in the cost required to construct the OLT.

SUMMARY OF THE INVENTION

Accordingly an object of the present invention is to provide a TDM PON and a dynamic bandwidth allocation method thereof to reduce the load of an OLT by performing distributed dynamic bandwidth allocation.

In accordance with one aspect of the present invention, there is provided a Time-Division-Multiplexed (TDM) Passive Optical Network (PON) including: an optical line terminal; a remote node including multiple secondary optical distributors connected to multiple optical network units. The multiple optical network units generate and output a corresponding upstream optical signal. Each of the secondary optical distributors splits an upstream optical signal input from one of the optical network units connected thereto so as to generate split upstream optical signals and transmits one of the split upstream optical signals to the optical line terminal, and transmits another split upstream optical signal to a different optical network unit.

In accordance with another aspect of the present invention, there is provided a dynamic bandwidth allocation method of a TDM PON including an optical line terminal, a remote node connected to the optical line terminal, and multiple optical network units connected to the remote node through multiple distribution fibers. The dynamic bandwidth allocation method includes (a) sequentially ordering the optical network units; (b) splitting an upstream optical signal transmitted from a higher-ordered optical network unit (c) transmitting one of the split upstream optical signals to the optical line terminal, and transmitting another split upstream optical signal to the lower-ordered optical network unit; and (d) sequentially repeating steps (b) and (c), wherein the lower-ordered optical network unit transmits a corresponding upstream optical signal to the remote node after a state of receiving the upstream optical signals from the remote node ends.

BRIEF DESCRIPTION OF THE DRAWINGS

The above features and advantages of the present invention will be more apparent from the following detailed description taken in conjunction with the accompanying drawings, in which.

DETAILED DESCRIPTION

Embodiments of the present invention will be described in detail herein below with reference to the accompanying drawings. For the purposes of clarity and simplicity, a detailed description of known functions and configurations incorporated herein will be omitted as it may obscure the subject matter of the present invention.

Figure 1:
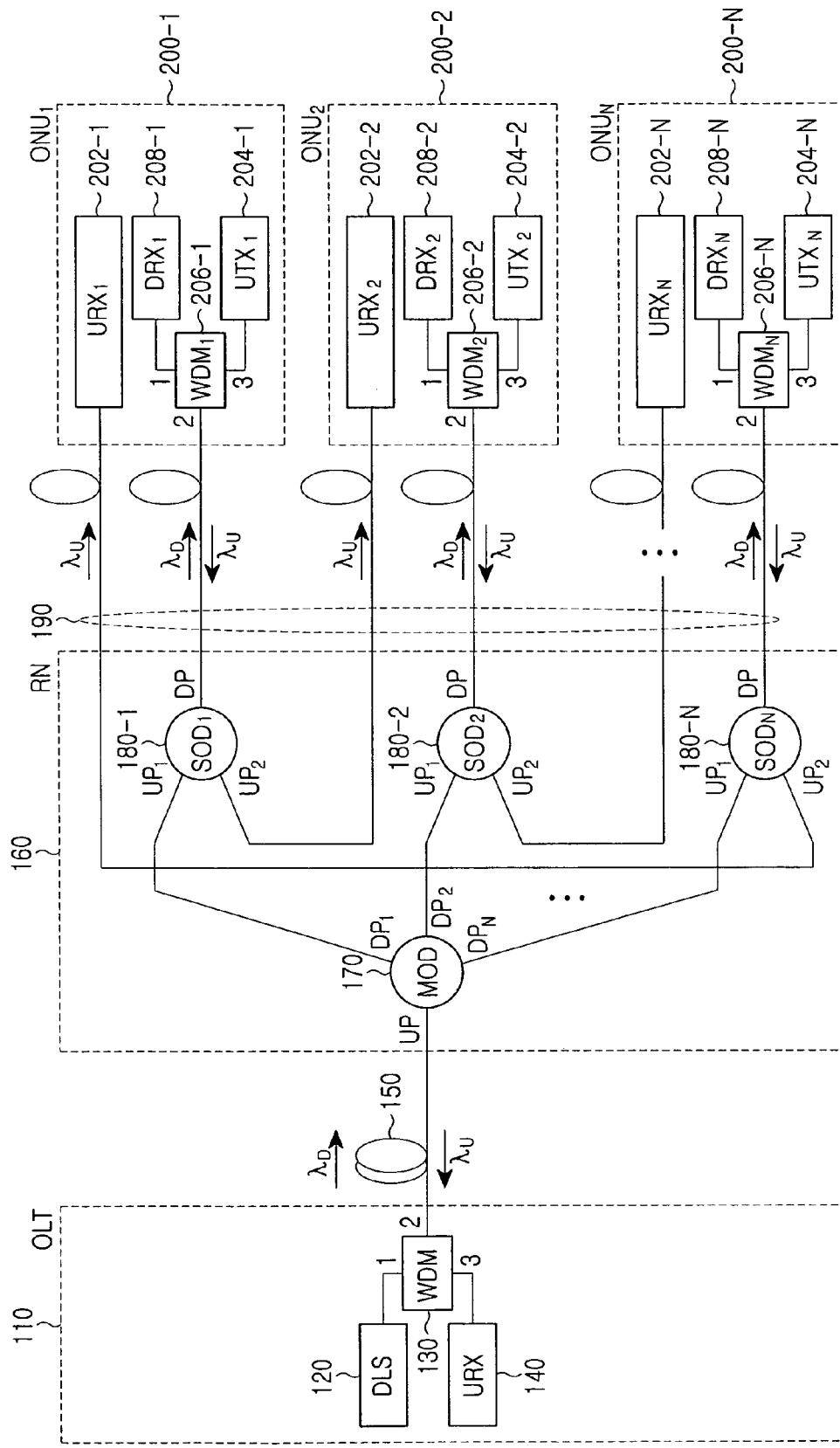
FIG. 1 is a block diagram illustrating a TDM PON according to a first example embodiment of the present invention.

FIG. 1 is a block diagram illustrating a TDM PON according to a first example embodiment of the present invention. The PON 100 includes an OLT 110, a Remote Node (RN) 160 and first to $N^{th}$ ONUs (200-1) to (200-N). In the PON 100, downstream transmission is performed based on a static bandwidth allocation method in which one cycle is divided into first to $N^{th}$ time slots with the same time length, and upstream transmission is performed based on a dynamic bandwidth allocation method.

The OLT 110 includes a Downstream Light Source (DLS) 120, an upstream optical receiver (URX) 140 and a Wavelength Division Multiplexer (WDM) 130.

The DLS 120 generates and outputs a downstream optical signal of a downstream wavelength $\lambda_D$. The downstream optical signal is sequentially modulated into first to $N^{th}$ downstream data signals employing the first to $N^{th}$ ONUs (200-1) to (200-N) as destinations, respectively. That is, an $m^{th}$ downstream data signal may have a time length corresponding to a maximum of one time slot.

The WDM 130 has a first port connected to the DLS 120, a second port connected to the RN 160 through a feeder fiber 150, and a third port connected to the URX 140. The WDM 130 transmits the downstream optical signals, which are input from the DLS 120, to the RN 160, and outputs upstream optical signals, which are input from the RN 160, to the URX 140.

The URX 140 performs photoelectric conversion for an upstream optical signal of an upstream wavelength $\lambda_U$ input from the WDM 130, thereby generating electrical signals. Then, the OLT 110 extracts upstream data from the electrical signals.

The RN 160 is connected to the first to $N^{th}$ ONUs (200-1) to (200-N) through 2n number of distribution fibers 190. The RN 160 includes a Main Optical Distributor (MOD) 170 and the first to $N^{th}$ Secondary Optical Distributors (SODs) (180-1) to (180-N).

The MOD 170 has an Upstream Port (UP) and first to $N^{th}$ Downstream Ports (DPs), the UP is connected to the OLT 110 through the feeder fiber 150, and the first to $N^{th}$ DPs are sequentially connected to the first to $N^{th}$ SODs (180-1) to (180-N) in a one-to-one fashion. The MOD 170 splits the downstream optical signal received from the OLT 110 so as to generate N downstream optical signals, and outputs the N downstream optical signals to the first to $N^{th}$ SODs (180-1) to (180-N), respectively. The MOD 170 transmits an upstream optical signal, which is input from one of the first to $N^{th}$ SODs (180-1) to (180-N), to the OLT 110.

The first to $N^{th}$ SODs (180-1) to (180-N) each have the same construction, and each of the first to $N^{th}$ SODs (180-1) to (180-N) is connected to a corresponding pair of ONUs through a corresponding pair of distribution fibers. Each of the first to $N^{th}$ ONUs (200-1) to (200-N) is connected to a corresponding pair of SODs through a corresponding pair of distribution fibers. The $m^{th}$ SOD (180-m) has a first UP connected to an $m^{th}$ DP of the MOD 170, a second UP connected to a $(m+1)^{th}$ ONU {200-(m+1)}, and a DP connected to an $m^{th}$ ONU (200-m). Herein, m is a natural number smaller than N. When m is equal to N, (m+1) has a value of 1. The $m^{th}$ SOD (180-m) transmits a downstream optical signal, which is input from the MOD 170, to the $m^{th}$ ONU (200-m), and splits an upstream optical signal input from the $m^{th}$ ONU (200-m) so as to generate one pair of upstream optical signals. Further, the $m^{th}$ SOD (180-m) outputs one of the upstream optical signals to the MOD 170, and transmits a remaining upstream optical signal to the $(m+1)^{th}$ ONU {200-(m+1)}.

The First to $N^{th}$ ONUs (200-1) to (200-N) each have the same construction, and the $m^{th}$ ONU (200-m) includes an URX (202-m), an UTX (204-m), a DRX (208-m) and a WDM (206-m).

The URX (202-m) is connected to the $(m-1)^{th}$ SOD {180-(m-1)} through the corresponding distribution fiber 190, and performs photoelectric conversion for an upstream optical signal received from the $(m-1)^{th}$ SOD {180-(m-1)} so as to generate an electrical signal. Herein, when m is equal to 1, (m-1) has a value of N.

The WDM (206-m) has a first port connected to the DRX (208-m), a second port connected to the $m^{th}$ SOD (180-m) through the corresponding distribution fiber 190, and a third port connected to the UTX (204-m). The WDM (206-m) outputs the downstream optical signal, which is received from the $m^{th}$ SOD (180-m), to the DRX (208-m), and transmits the upstream optical signal, which is input from the UTX (204-m), to the $m^{th}$ SOD (180-m).

The DRX (208-m) performs photoelectric conversion for the downstream optical signal input from the WDM (206-m) so as to generate an electrical signal. Then, the $m^{th}$ ONU (200-m) extracts $m^{th}$ downstream data, which has been transmitted in an $m^{th}$ time slot, from the electrical signal.

The UTX (204-m) generates and outputs an upstream optical signal of an upstream wavelength $\lambda_U$.

In the case of upstream transmission, the $m^{th}$ ONU (200-m) repeatedly operates in a sequence of an idle mode, a standby mode and a transmission mode.

The idle mode represents a state in which the $m^{th}$ ONU (200-m) does not receive and transmit an upstream optical signal. In the idle mode, the $m^{th}$ ONU (200-m) can receive a downstream optical signal, but does not transmit an upstream optical signal.

The standby mode represents a state in which the $m^{th}$ ONU (200-m) receives an upstream optical signal. In the standby mode, the $m^{th}$ ONU (200-m) can simultaneously receive upstream and downstream optical signals, but does not transmit the upstream optical signal.

The transmission mode represents a state in which the $m^{th}$ ONU (200-m) transmits an upstream optical signal. In the transmission mode, the $m^{th}$ ONU (200-m) can receive a downstream optical signal, and simultaneously transmit an upstream optical signal.

The $m^{th}$ ONU (200-m) operates in the transmission mode when the standby mode ends, and the $(m+1)^{th}$ ONU {200-(m+1)} operates in the standby mode when the $m^{th}$ ONU (200-m) starts the transmission mode.

The first to $N^{th}$ ONUs (200-1) to (200-N) sequentially operate in the transmission mode according to the aforedescribed procedure.

For the initial start of upstream transmission, the OLT 110 transmits a message (upstream transmission start message) indicating the start of the upstream transmission to the first ONU (200-1). The first ONU (200-1) having received the upstream transmission start message directly switches from an idle mode to a transmission mode, and operates in the transmission mode.

In order to prevent the upstream transmission from being interrupted, each of the first to $N^{th}$ ONUs (200-1) to (200-N) transmits an upstream optical signal during a preset time period even when upstream data to be transmitted does not exist.

In the TDM PON 100, the first to $N^{th}$ ONUs (200-1) to (200-N) mainly perform a dynamic bandwidth allocation function, and the OLT 110 performs a secondary function, so that it is possible to perform distributed dynamic bandwidth allocation.

The dynamic bandwidth allocation method of the TDM PON 100 includes the following steps (a) to (d).

In step (a), the first to $N^{th}$ ONUs (200-1) to (200-N) are ordered. That is, a high priority is given to an ONU initially performing upstream transmission before other ONUs. For example, if the $N^{th}$ ONU (200-N) initially performs the upstream transmission, the $N^{th}$ ONU (200-N) is ordered high, and the first ONU (200-1) is ordered low. Likewise, if the first ONU (200-1) initially performs the upstream transmission, the first ONU (200-1) is ordered high, and the $N^{th}$ ONU (200-N) is ordered low.

In step (b), an upstream optical signal transmitted from a highly-ordered ONU to the RN 160 is split to generate one pair of upstream optical signals. Step (b) is performed by a corresponding SOD of the RN 160.

In step (c), one of the upstream optical signals is transmitted upward to the OLT 110, the remaining upstream optical signal is transmitted downward to a low-ordered ONU. In step (c), the upstream transmission is performed by the SOD and the MOD 170, and the downstream transmission is performed by the SOD.

In step (d), steps (b) and (c) are sequentially repeated.

While steps (a) to (d) are performed, directly after a state of receiving upstream optical signals from the RN 160 ends, the low-ordered ONU transmits a corresponding upstream optical signal to the RN 160, thereby preventing different upstream optical signals from being transmitted to the RN 160 during the upstream transmission intervals of the upstream optical signals. In other words, the low-ordered ONU changes from standby mode to transmission mode directly after the low-ordered ONU stops receiving upstream optical signals from the RN 160.

The dynamic bandwidth allocation structure according to the first embodiment of the present invention can also be applied to a TDM/SCM PON. In a SCM PON, multiple subscribers share a single subcarrier, and a subcarrier with a unique frequency is allocated to each subscriber. In a TDM/SCM PON, subscribers of multiple groups share a single wavelength, and multiple frequencies are allocated to the subscribers of the multiple groups in a one-to-group manner.

Figure 2:
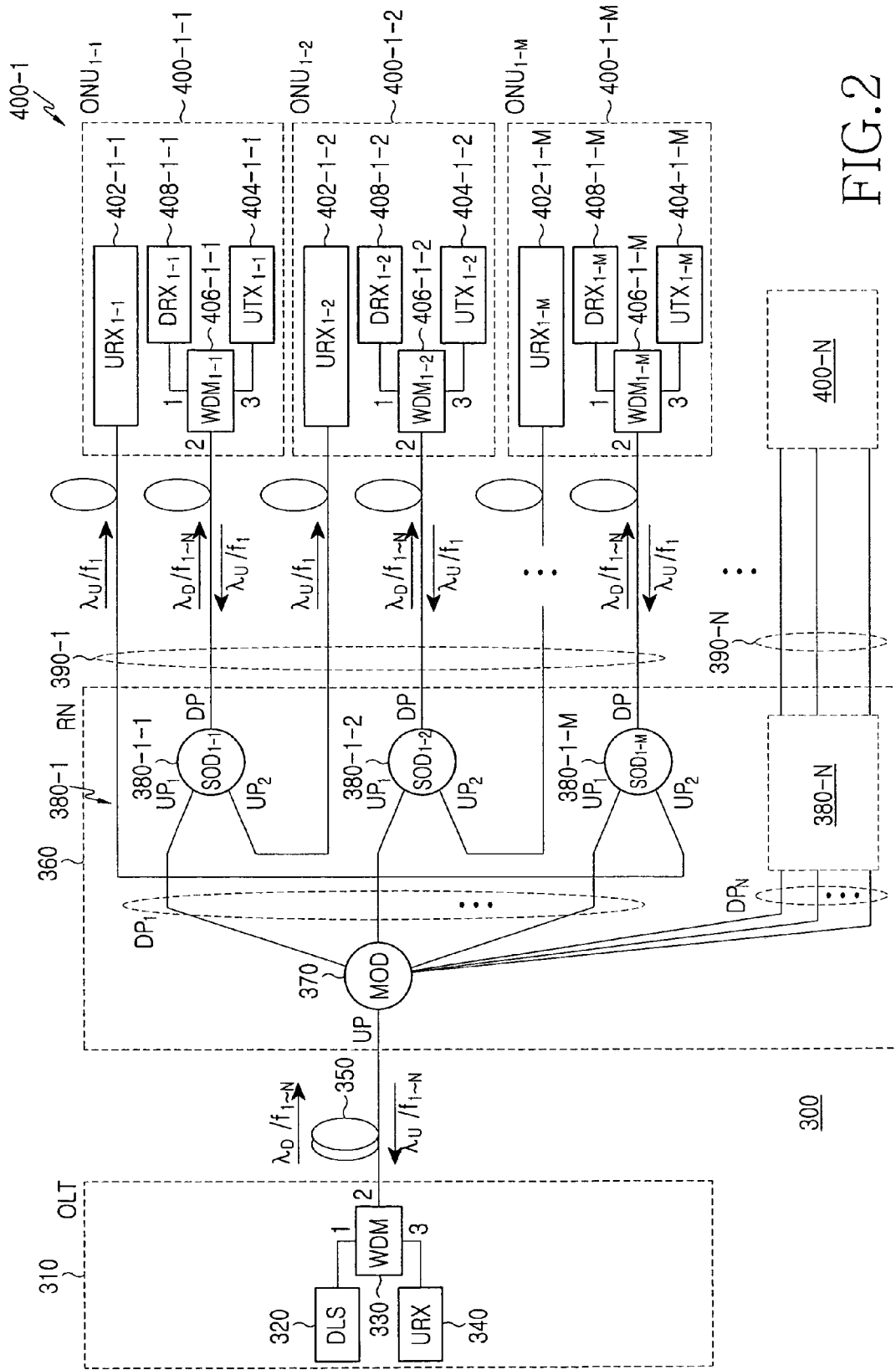
FIG. 2 is a block diagram illustrating a TDM PON according to a second example embodiment of the present invention.
Figure 3:
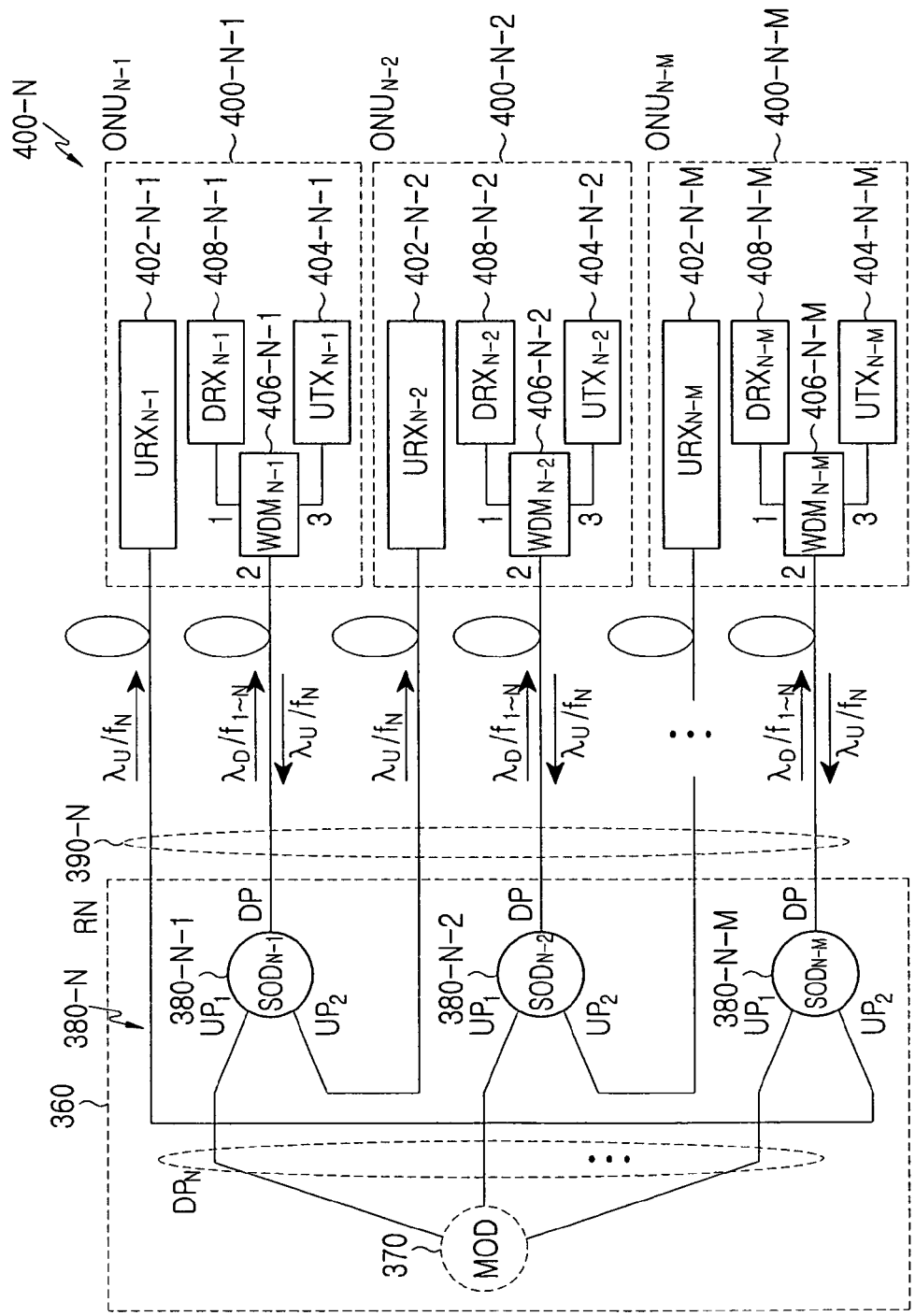
FIG. 3 is a detailed block diagram of the elements schematically illustrated in FIG. 2.

FIG. 2 is a block diagram illustrating a TDM PON according to a second example embodiment of the present invention, and FIG. 3 is a detailed block diagram of the elements schematically illustrated in FIG. 2. The PON 300 includes an OLT 310, a RN 360 and ONUs {(400-1)-1} to {(400-N)-M} of the first to $N^{th}$ groups (400-1) to (400-N). In the PON 300, downstream transmission is performed based on a static bandwidth allocation method in which one cycle is divided into first to $N^{th}$ time slots with the same time length, and upstream transmission is performed based on a dynamic bandwidth allocation method.

The OLT 310 includes a DLS 320, an URX 340 and a WDM 330.

The DLS 320 generates and outputs a downstream optical signal of a downstream wavelength $\lambda_D$. The downstream optical signal has been sequentially modulated into first to $N^{th}$ subcarriers having first to $N^{th}$ frequencies $f_1$ to $f_N$, and each of the subcarriers has been modulated into downstream data signals of a corresponding group. That is, an $m^{th}$ subcarrier is sequentially modulated into first to $m^{th}$ downstream data signals of an $m^{th}$ group, and the first to $m^{th}$ downstream data signals employ the first to $m^{th}$ ONUs {(400-m)-1} to {(400-m)-N} of the $m^{th}$ group as destinations, respectively. That is, the $m^{th}$ downstream data signal of the $m^{th}$ group may have a time length corresponding to a maximum of one time slot. Herein, m is a natural number smaller than N.

The WDM 330 has a first port connected to the DLS 320, a second port connected to the RN 360 through a feeder fiber 350, and a third port connected to the URX 340. The WDM 330 transmits the downstream optical signals, which are input from the DLS 320, to the RN 360, and outputs upstream optical signals, which are input from the RN 360, to the URX 340.

The URX 340 performs photoelectric conversion for the upstream optical signals input from the WDM 330, thereby generating electrical signals. Then, the OLT 310 sequentially extracts both the first to $N^{th}$ subcarriers and upstream data signals of the first to $m^{th}$ groups from the electrical signals. The URX 340 may use a combination of a photodiode for photoelectric conversion and a demultiplexer for frequency division demultiplexing.

The RN 360 is connected to the ONUs {(400-1)-1} to {(400-N)-M} of the first to $N^{th}$ groups (400-1) to (400-N) through distribution fibers of the first to $N^{th}$ groups (390-1) to (390-N). The RN 360 includes a MOD 370 and the first to $N^{th}$ SODs {(380-1)-1} to {(380-N)-M} of the first to $N^{th}$ groups (380-1) to (380-N).

The MOD 370 has a UP and DPs of the first to $N^{th}$ groups $DP_1$ to $DP_N$, the UP is connected to the OLT 310 through the feeder fiber 350, and the DPs are sequentially connected to the first to $N^{th}$ SODs {(380-1)-1} to {(380-N)-M} of the first to $N^{th}$ groups (380-1) to (380-N) in a group-to-group manner. The $p^{th}$ DP of an $m^{th}$ group $DP_m$ is connected to the $p^{th}$ SOD {(380-m)-p} of an $m^{th}$ group (380-m). Herein, p is a natural number smaller than M. The MOD 370 splits the downstream optical signal received from the OLT 310 so as to generate (N*M) downstream optical signals, and outputs the (N*M) downstream optical signals to the first to $N^{th}$ SODs {(380-1)-1} to {(380-N)-M} of the first to $N^{th}$ groups (380-1) to (380-N), respectively. The MOD 370 outputs upstream optical signals to the OLT 310, the upstream optical signals being input from the first to $N^{th}$ SODs {(380-1)-1} to {(380-N)-M} of the first to $N^{th}$ groups (380-1) to (380-N).

The first to $N^{th}$ SODs {(380-1)-1} to {(380-N)-M} each have the same construction, which are sequentially connected to the ONUs {(400-1)-1} to {(400-N-M)} of the first to $N^{th}$ groups (400-1) to (400-N) through the distribution fibers of the first to $N^{th}$ groups (390-1) to (390-N) in a group-to-group manner. The $p^{th}$ SOD {(380-m)-p} of the $m^{th}$ group (380-m) is connected to the $p^{th}$ ONU {(400-m)-p} of the $m^{th}$ groups (400-m) through a corresponding pair of distribution fibers in the $m^{th}$ group (390-m). The $p^{th}$ SOD {(380-m)-p} of the $m^{th}$ group (380-m) has a first UP, a second UP and a DP. The first UP is connected to the $p^{th}$ DP of the $m^{th}$ group $DP_m$ of the MOD 370, the second UP is connected to the $(p+1)^{th}$ ONU {(400-m)-(p+1)} of the $m^{th}$ group (400-m), and the DP is connected to the $p^{th}$ ONU {(400-m)-p} of the $m^{th}$ group (400-m). When p is equal to M, (p+1) has a value of 1. The $p^{th}$ SOD {(380-m)-p} of the $m^{th}$ group (380-m) transmits a downstream optical signal, which is input from the MOD 370, to the $p^{th}$ ONU {(400-m)-p} of the $m^{th}$ group (400-m), and splits an upstream optical signal input from the $p^{th}$ ONU {(400-m)-p} of the $m^{th}$ group (400-m) so as to generate one pair of upstream optical signals. Then, the $p^{th}$ SOD {(380-m)-p} of the $m^{th}$ group (380-m) outputs one of the upstream optical signals to the MOD 370, and outputs a remaining upstream optical signal to the $(p+1)^{th}$ ONU {(400-m)-(p+1)} of the $m^{th}$ group (400-m).

The ONUs {(400-1)-1} to {(400-N-M)} of the first to $N^{th}$ groups (400-1) to (400-N) each have the same construction, and the $p^{th}$ ONU {(400-m)-p} of the $m^{th}$ group (400-m) includes an URX {(402-m)-p}, an UTX {(404-m)-p}, a DRX {(408-m)-p} and a WDM {(406-m)-p}.

The URX {(402-m)-p} is connected to the $(p-1)^{th}$ SOD {380-m-(p-1)} of the $m^{th}$ group (380-m) through the corresponding distribution fiber of the $m^{th}$ group (390-m), and performs photoelectric conversion for an upstream optical signal received from the $(p-1)^{th}$ SOD {380-m-(p-1)} of the $m^{th}$ group (380-m) so as to generate an electrical signal. Herein, when p is equal to 1, (p−1) has a value of M.

The WDM {(406-m)-p} has a first port connected to the DRX {(408-m)-p}, a second port connected to the $p^{th}$ SOD {(380-m)-p} of the $m^{th}$ group (380-m) through the corresponding distribution fiber of the $m^{th}$ group (390-m), and a third port connected to the UTX {(404-m)-p}. The WDM {(406-m)-p} outputs the downstream optical signal, which is received from the $p^{th}$ SOD {(380-m)-p} of the $m^{th}$ group (380-m), to the DRX {(408-m)-p}, and transmits the upstream optical signal, which is input from the UTX {(404-m)-p}, to the $p^{th}$ SOD {(380-m)-p} of the $m^{th}$ group (380-m).

The DRX {(408-m)-p} performs photoelectric conversion for the downstream optical signal input from the WDM {(406-m)-p} so as to generate an electrical signal. Then, the $p^{th}$ ONU {(400-m)-p} of the $m^{th}$ group (400-m) extracts an $m^{th}$ subcarrier from the electrical signal, and extracts $p^{th}$ downstream data of the $m^{th}$ group, which has been transmitted in the $p^{th}$ time slot, from the $m^{th}$ subcarrier. The DRX {(408-m)-p} may use a combination of a photodiode for photoelectric conversion and a demultiplexer for frequency division demultiplexing.

The UTX {(404-m)-p} generates and outputs an upstream optical signal of an upstream wavelength $\lambda_U$. The upstream optical signal has been modulated into an $m^{th}$ subcarrier with an $m^{th}$ frequency $f_m$, and the $m^{th}$ subcarrier has been modulated into the $p^{th}$ upstream data signal of an $m^{th}$ group.

In the case of upstream transmission, the $p^{th}$ ONU {(400-m)-p} of the $m^{th}$ group (400-m) repeatedly operates in a sequence of an idle mode, a standby mode and a transmission mode.

The idle mode represents a state in which the $p^{th}$ ONU {(400-m)-p} of the $m^{th}$ group (400-m) does not receive and transmit an upstream optical signal. In the idle mode, the $p^{th}$ ONU {(400-m)-p} of the $m^{th}$ group (400-m) can receive a downstream optical signal, but does not transmit an upstream optical signal.

The standby mode represents a state in which the $p^{th}$ ONU {(400-m)-p} of the $m^{th}$ group (400-m) receives an upstream optical signal. In the standby mode, the $p^{th}$ ONU {(400-m)-p} of the $m^{th}$ group (400-m) can simultaneously receive upstream and downstream optical signals, but does not transmit the upstream optical signal.

The transmission mode represents a state in which the $p^{th}$ ONU {(400-m)-p} of the $m^{th}$ group (400-m) transmits an upstream optical signal. In the transmission mode, the $p^{th}$ ONU {(400-m)-p} of the $m^{th}$ group (400-m) can receive a downstream optical signal, and simultaneously transmit an upstream optical signal.

The $p^{th}$ ONU {(400-m)-p} of the $m^{th}$ group (400-m) operates in the transmission mode when the standby mode ends, and the $(p+1)^{th}$ ONU {(400-m-(p+1)} of the $m^{th}$ group (400-m) operates in the standby mode when $p^{th}$ ONU {(400-m)-p} of the $m^{th}$ group (400-m) starts the transmission mode.

The first to $m^{th}$ ONUs {(400-m)-1} to {(400-m)-M} of the $m^{th}$ group (400-m) sequentially operate in the transmission mode according to the afore-described procedure.

For the initial start of upstream transmission, the OLT 310 transmits a message (upstream transmission start message) indicating the start of the upstream transmission to the first to $n^{th}$ ONUs {(400-1)-1} to {(400-N)-1} of the first to $n^{th}$ groups (400-1) to (400-N). The first to $n^{th}$ ONUs {(400-1)-1} to {(400-N)-1} having received the upstream transmission start message directly switch from an idle mode to a transmission mode, and operate in the transmission mode.

In order to prevent the upstream transmission from being interrupted, each of the ONUs {(400-1)-1} to {(400-N)-M} of the first to $n^{th}$ groups (400-1) to (400-N) transmit upstream optical signals during a preset time period even when upstream data to be transmitted does not exist.

As described above, according to a TDM PON and a dynamic bandwidth allocation method thereof based on the present invention, an upstream optical signal transmitted from a highly-ordered ONU is partially transmitted to a low-ordered ONU, and the low-ordered ONU performs its own upstream transmission directly after the upstream transmission of the highly-ordered ONU, so that it is possible to perform distributed dynamic bandwidth allocation in a simple way. As a result, the overload of an OLT can be alleviated and the cost required to construct the OLT can be reduced.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A Time-Division-Multiplexed (TDM) Passive Optical Network (PON) comprising:
   an optical line terminal;
   a remote node including multiple secondary optical distributors connected to multiple optical network units; and
   the multiple optical network units generating and outputting upstream optical signals,
   wherein each of the secondary optical distributors splits an upstream optical signal input from a first optical network unit connected thereto and transmits one of the split upstream optical signals to the optical line terminal, and transmits another one of the split upstream optical signals to a second optical network unit.

2. The TDM PON as claimed in claim 1, wherein the second optical network unit begins transmitting optical signals upstream when reception of the split upstream optical signal ends.

3. The TDM PON as claimed in claim 1, wherein each of the optical network units sequentially transmits a corresponding upstream optical signal to the remote node directly after a state of receiving the upstream optical signals from the remote node ends.

4. The TDM PON as claimed in claim 1, wherein the remote node further comprises a main optical distributor which is connected to the secondary optical distributors, transmits the upstream optical signals, which are input from the secondary optical distributors, to the optical line terminal, splits a downstream optical signal received from the optical line terminal so as to generate multiple downstream optical signals, and outputs the downstream optical signals to the optical network units in a one-to-one fashion.

5. The TDM PON as claimed in claim 1, wherein each of the optical network units comprises:
   an upstream optical receiver receiving upstream optical signals from the remote node;
   a downstream optical receiver receiving downstream optical signals from the remote node; and
   an upstream light source transmitting the upstream optical signals to the remote node.

6. The TDM PON as claimed in claim 5, wherein each of the optical network units further comprising a wavelength division multiplexer for outputting the downstream optical signals, which are received from the remote node, to the downstream optical receiver, and transmitting the upstream optical signals, which are input from the upstream light source, to the remote node.

7. The TDM PON as claimed in claim 1, wherein the first optical network unit receives an upstream transmission start message and begins operating in a transmission mode, the second optical network unit and the optical line unit begin receiving the upstream transmission from the first optical network unit.

8. The TDM PON as claimed in claim 7, wherein when the first optical network unit ends upstream transmission, the second optical network unit begins operating in a transmission mode, a third optical network unit and the optical line unit begin receiving an upstream transmission from the second optical network unit.

9. A remote node in a Time-Division-Multiplexed (TDM) Passive Optical Network (PON) comprising:
   a main optical distributor transmitting upstream optical signals and outputs downstream optical signals; and secondary optical distributors receiving upstream optical signals from optical network units and the transmitting upstream optical signals to the main optical distributor, receiving downstream optical signals from the main optical distributor and transmitting the downstream optical signals to the optical network units, wherein the secondary optical distributors split an upstream optical signal input from an optical network unit connected respectively thereto and transmits one of the split upstream optical signals to the optical line terminal, and transmits another one of the split upstream optical signals to a different optical network unit.

10. A dynamic bandwidth allocation method of a TDM PON including an optical line terminal, a remote node connected to the optical line terminal, and multiple optical network units connected to the remote node through multiple distribution fibers, the dynamic bandwidth allocation method comprising the steps of:

(a) sequentially ordering the optical network units;

(b) splitting an upstream optical signal transmitted from a higher-ordered optical network unit;

(c) transmitting one of the split upstream optical signals to the optical line terminal, and transmitting another split upstream optical signal to the lower-ordered optical network unit; and (d) sequentially repeating steps (b) and (c), wherein the lower-ordered optical network unit transmits a corresponding upstream optical signal to the remote node after a state of receiving the split upstream optical signal ends.

11. The dynamic bandwidth allocation method claimed in claim 10, wherein each of optical network unit sequentially transmits a corresponding upstream optical signal to the remote node directly after a state of receiving the upstream optical signals from the remote node ends.

12. The dynamic bandwidth allocation method claimed in claim 10, further comprising the step of receiving an upstream transmission start message causing an optical network unit to begin operating in a transmission mode.

* * * * *

UNITED STATES PATENT AND TRADEMARK OFFICE
CERTIFICATE OF CORRECTION

PATENT NO. : 7,639,949 B2
APPLICATION NO. : 11/644570
DATED : December 29, 2009
INVENTOR(S) : Jung et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 540 days.

Signed and Sealed this

Ninth Day of November, 2010

David J. Kappos
*Director of the United States Patent and Trademark Office*